United States Patent [19]

Sherman

[11] 3,932,747

[45] Jan. 13, 1976

[54] NONFLUID-FILLED BOREHOLE LOGGING APPARATUS

[75] Inventor: Harold Sherman, Ridgefield, Conn.

[73] Assignee: Schlumberger Technology Corporation, New York, N.Y.

[22] Filed: May 23, 1974

[21] Appl. No.: 472,916

[52] U.S. Cl. ............... 250/256; 250/268; 250/269
[51] Int. Cl.². ......................................... G01V 5/00
[58] Field of Search ........... 250/252, 253, 256, 265, 250/267, 268, 269, 270

[56] References Cited
UNITED STATES PATENTS

| | | | |
|---|---|---|---|
| 2,996,618 | 8/1961 | Goodman et al. | 250/265 |
| 3,538,330 | 11/1970 | Youmans | 250/269 |
| 3,789,217 | 1/1974 | Youmans | 250/265 |
| 3,862,418 | 1/1975 | Preiss | 250/269 X |

*Primary Examiner*—Davis L. Willis

[57] ABSTRACT

In accordance with an illustrative embodiment of the present invention, apparatus for furnishing a desired borehole environment in nonfluid-filled borehole logging operations when radioactivity logging methods are being employed includes a member covering a portion of a sonde, which portion has at least one radiation detector. The member is fabricated of a material selected to simulate a particular borehole environment and is arranged for attachment to the sonde to prevent longitudinal and rotational movement therebetween. The outer surface of the member conforms generally to the borehole.

24 Claims, 4 Drawing Figures

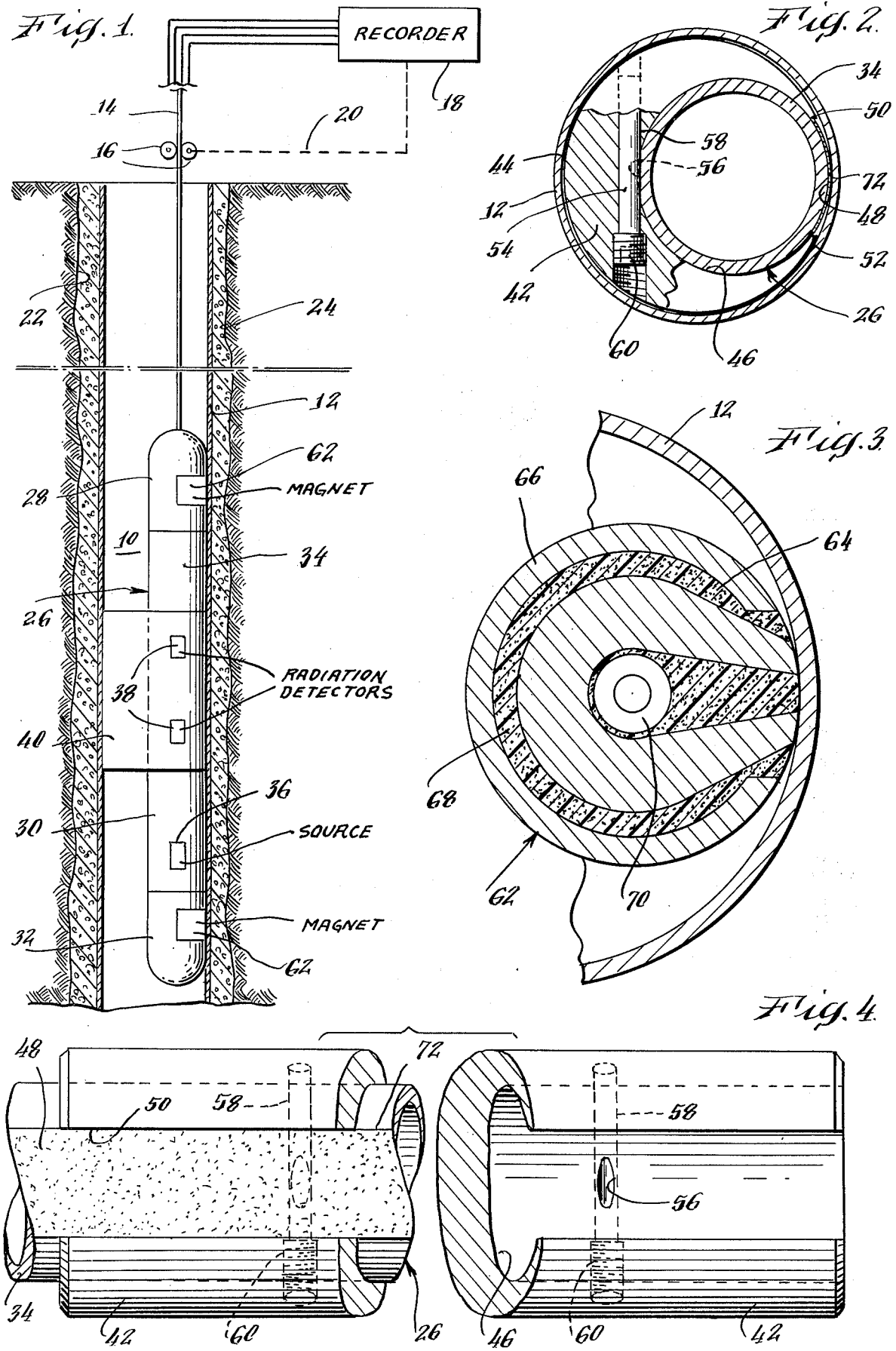

NONFLUID-FILLED BOREHOLE LOGGING APPARATUS

BACKGROUND OF THE INVENTION

1. Field of the Invention

The present invention is concerned with radioactive well logging and, more particularly, logging operations that are performed in a nonfluid-filled borehole.

2. Description of the Prior Art

Commonly, radioactive well logging in cased, air or gas-filled boreholes requires either special equipment or, at a minimum, extensive corrections to the log produced by a sonde intended for use under fluid-filled borehole standard conditions. Generally, the magnitude of the correction required increases with the inner diameter of the borehole. The change from a fluid-filled to a substantially air-filled borehole, however, is frequently such a significant departure from the design conditions of the sonde that correction of the log with acceptable accuracy is usually not possible, regardless of the borehole inner diameter.

It is desirable, therefore, that the sonde be compensated for the lack of fluid in the borehole, so that the combined result of other borehole variables, such as temperature and pressure, requires only a small correction to the log.

Prior art well logging systems have used displacement sleeves in fluid-filled, cased-hole radioactive logging. When chlorine logging in large, cased-holes using a neutron source, for example, it is desirable to use a displacement sleeve when the casing is filled with salt water. The sleeve serves the purpose of minimizing, to the greatest extent possible, the effects of the neutron capture by the chlorine in the borehole fluid by physically displacing the fluid located between the sonde and the casing in the source/detector area. Such fluid displacement sleeves are generally formed to slide over a sonde and are clamped or otherwise held in position to displace borehole fluid from around the sonde to the outside diameter of the sleeve, which is less than the casing inside diameter by an amount adequate to provide the required sleeve/casing clearance and borehole fluid bypass space.

Also known, is the use of a sleeve on the outside of a sonde to shield the sonde from certain types of radioactive emissions. It may be desirable, for example, to shield a sonde having a detector that measures neutron capture gamma rays of a selected energy range from all arriving neutrons in order to limit the effects on detected gamma ray count rates of neutron capture by sonde materials. Such a shielding sleeve would be manufactured of a material containing a good neutron absorber, such as boron carbide, in sufficient quantity to absorb any expected incidence of neutron irradiation. Commonly, both fluid displacement and shielding functions are required of a single sleeve, and assignee of the present invention has had such sleeves in commercial use for a number of years. However, such shielding sleeves have not been directed to the problem of compensating a sonde for a lack of fluid in a borehole.

SUMMARY OF THE INVENTION

There is provided, in accordance with the present invention, apparatus for furnishing a desired borehole environment in nonfluid-filled logging operations when radioactivity logging methods are being employed. In a preferred embodiment, an elongated sleeve covers a portion of a sonde that includes at least one radiation detector. The sleeve is fabricated of a material that provides a particular borehole environment and is arranged for attachment to the sonde to prevent longitudinal and rotational movement therebetween. The sleeve has, in transverse cross-section, an outer surface that conforms generally to the borehole and an inner surface that conforms generally to the sonde. As an alternative to providing a separate sleeve for attachment to the sonde, it may be desirable to provide a zone of the sonde or exploring device that is enlarged with respect to the sonde diameter and is fabricated of a material selected to provide a particular borehole environment. The enlarged zone encompasses a portion of the sonde that includes the radiation detector and has an outer surface that conforms generally to the borehole.

It is, therefore, an object of the present invention to provide apparatus that gives a desired borehole environment for radioactivity logging operations in nonfluid filled boreholes.

It is a further object of the present invention to provide apparatus for easily and conveniently modifying a radioactivity logging sonde intended for use in a fluid-filled borehole to operate properly in a nonfluid environment.

It is a still further object of the present invention to provide apparatus for furnishing a hydrogenous environment in a nonfluid-filled borehole to a neutron logging sonde.

BRIEF DESCRIPTION OF THE DRAWINGS

The above and other objects will become more apparent and a better understanding of the invention will be gained from a consideration of the following description of the preferred embodiments, taken in conjunction with the appended figures of the drawing, in which:

FIG. 1 is a representational view in longitudinal section showing a sonde, modified in accordance with the present invention, traversing a borehole;

FIG. 2 is a view in transverse cross-section of a sleeve according to the present invention secured to a sonde;

FIG. 3 is a partial, cross-sectional view of a magnetic positioning device, and

FIG. 4 is a view of a sleeve, according to the present invention, partially broken away to show a means for securing the sleeve to a sonde.

DESCRIPTION OF THE PREFERRED EMBODIMENTS

In the representative embodiments of the invention described hereinafter, a desired borehole environment is provided for radioactivity logging operations conducted in nonfluid-filled boreholes. When apparatus providing the particular environment is formed as a sleeve, separate from a sonde intended for use in a fluid-filled borehole, it is possible easily and conveniently to modify the sonde for proper operation in a non-fluid environment.

Referring to FIG. 1, apparatus that embodies the present invention for use in a cased borehole is indicated generally by the numeral 10 and is adapted for suspension in casing 12 by means of a cable 14 and a winch (not shown) located at the earth's surface. The cable and winch are used to lower and raise the apparatus 10 through the casing in a conventional manner. Information from the apparatus 10 is transmitted to the surface via cable 14 to conventional surface indicating means 18, such as a recorder.

The indicating means 18 may be mechanically driven in a well-known manner by a drive connection, indicated by a dashed line 20 from a rotating wheel 16 that is mechanically driven by the cable 12 so that the information from the apparatus 20 is recorded against a depth base as the apparatus is passed along the casing.

Casing 12 is disposed in a borehole 22 and cemented thereto by a column or body of cement 24, and is devoid of all fluids, such as drilling mud or water.

Apparatus 10 generally includes an exploring device or sonde 26 intended primarily for use in fluid-filled borehole conditions and having an upper head section 28, a main section 30 and a lower nose section 32. The sonde 26 is enclosed within a pressure resistant housing 34, shown in cross-section in FIG. 2, and within the sonde main section 30 is located a radiation source 36 and one or more radiation detectors 38.

The type of radiation emitted by the source 36 into the surrounding earth formation, the required number and spacing of detectors 38, and thee nature of the radiation detected by the detectors 38 will depend upon the particular formation parameter that has been selected for evaluation. For example, if an indication of formation porosity is desired, the source 36 may be a conventional plutonium-beryllium or actinium-beryllium neutron source, two detectors 38 at different spacings from the source may be required, and the detectors 38 may be conventional devices for detecting thermal neutrons.

Alternatively, it may be possible to obtain an indication of formation porosity with a sonde in which the detectors are devices for detecting either epithermal neutrons or gamma rays, and it is not intended that the present invention be limited either to any particular radiation source, to any number and spacing of detectors or to any particular detector type.

In accordance with the present invention, the main section 30 also includes an enlarged zone or sleeve 40 that encompasses a portion of the sonde including the radiation detectors 38. The zone or sleeve 40 may either be integral with the sonde 26, for example, as a special section of housing 34, or be a separate sleeve that can be secured to the sonde when nonfluid-filled borehole operation of the sonde is contemplated. Although the zone or sleeve 40 may cover the source and other portions of the main section 30, it is important that at least the radiation detector or detectors be covered to insure that the proper borehole environment is provided for operation of the sonde.

While the present invention may be embodied in either an expanded zone of the sonde or exploring device 26 or a separate sleeve intended for attachment to the sonde, FIGS. 2, 3 and 4 disclosure the invention in the form of a covering member or sleeve 42. As shown in FIG. 2, the outer surface 44 of sleeve 42 conforms generally to the inner surface of the casing 12. A clearance space between the sleeve and the casing is required, but the space required is not large since it is not necessary to provide notches or channels in the sleeve to bypass fluid as the sleeve is intended for use in nonfluid-filled cased hole logging.

The sleeve 42 is fabricated of a material selected to simulate a particular borehole environment. For example, with a sonde that is intended for use in a hydrogenous environment and either has a neutron source for irradiating the surrounding earth formation or has a neutron source and one or more neutron detectors, it will be desirable to fabricate the sleeve of a hydrogenous material, since the cased hole will be devoid of fluid and the sonde may not perform properly in the absence of a hydrogenous medium. Under such circumstances, a particularly advantageous material is a high molecular weight, high density polyethylene since it has a hydrogen density very close to that of water and possesses unusually good mechanical properties, which simplifies the manufacture of the sleeve since it is possible to machine a sleeve from the polyethylene that will retain its shape without other means of support.

More specifically, a sleeve 42 that is fabricated of high density polyethylene and positioned as shown in FIG. 1 on a Schlumberger Well Services dual-spacing neutron sonde recording a Compensated Neutron Log provides excellent results. The sonde is designed for use in a hydrogenous medium and has a neutron source and two thermal neutron detectors, each at a different spacing from the source. Since the sonde does not perform properly in the absence of a hydrogenous medium, the sleeve 42, which is formed to enclose only the two detectors, provides the necessary hydrogenous environment and, with the source uncovered, results in a slight improvement in porosity resolution. The polyethylene sleeve is effective with the neutron source/neutron detector combination since the overwhelming contribution to the detector count rates comes directly from source neutrons in the absence of a hydrogenous medium in the borehole. However, it is not the function of the sleeve to absorb all source neutrons, but to simulate the fluid environment normally found around the sonde while logging operations are being conducted in a fluid-filled borehole. The use of a sleeve for furnishing the desired environment has the added advantage of providing a simple modification to the sonde that permits logging in a nonfluid-filled, cased borehole yet leaves the basic sonde unchanged in its ability to operate in other environments.

For sonde radiation sources other than neutron sources or for sonde source/detector combinations other than neutron source/neutron detector combinations, materials for fabrication of the sleeve other than polyethylene may be desirable. The choice of the proper material will depend on the environment that is required in the nonfluid-filled cased borehole for proper operation of the particular sonde 26 being employed.

The sleeve 42 may be of any size depending on the diameter of the casing in which the logging operations are to be performed, the objective being to occupy as much of the nonfluid-filled borehole as possible with the desired environment. Commonly, casings of either 5.5 inches or 7 inches diameter are encountered and suitable sleeve diameters providing the proper clearance with such casings might be 4.62 inches and 5.75 inches, respectively.

Referring to FIG. 2, the sleeve 42 has an inner surface 46 that conforms generally to the sonde housing 34. The sleeve 42 may be fabricated so that the outer surface 44 and the inner surface 46 are concentric, that is, so that the sonde passes generally through the center of the casing. Particular sondes, however, may have a preferred azimuthal orientation or it may be desirable for other reasons, for example, to achieve improved detector sensitivity, to eccenter the sonde within the casing by fabricating the sleeve 42 so that the inner and outer surfaces are eccentric with respect to one another.

Further, it may be advantageous to provide that the sonde housing 34 passes through the borehole in contact with the casing in order to obtain the highest detector count rates possible. In such a case, shown in FIG. 3, the sleeve 42 will be generally crescent shaped in transverse cross-section. Thereby, a longitudinal strip 48 of the housing 34, as shown in FIG. 4, will be uncovered between the generally parallel edges 50 and 52 of the crescent shaped sleeve 42. It has been determined that the configuration shown in FIGS. 2 and 4 is the most advantageous for use with the dual-spacing neutron sonde identified above.

Attachment of the sleeve 42 to the sonde may be accomplished in any conventional manner that prevents longitudinal and rotational movement between the sleeve and the sonde, the prevention of such movement being especially desirable if sonde azimuthal orientation or eccentering are important considerations.

One suitable method is to provide one or more pins 54 that pass through the sleeve 42 and engage the housing 34. At each pin location, the housing 34 has a notch 56, which the body 58 of the pin engages. The pin head 60 is threaded and the sleeve 42 is correspondingly drilled and tapped so that the pin 54 may be put in place and tightly secured once the sleeve 42 and housing 34 are in proper alignment.

Again, the advantageous mechanical properties of polyethylene simplify the manufacture of the sleeve 42, since the required drilling and tapping may be performed directly in the polyethylene without the necessity of providing an insert of metal or other rigid material.

If, for the reasons indicated above, it is desirable that the sonde 26 pass through the borehole while in contact with the casing 12, the sleeve may, in accordance with the present invention, be combined with apparatus for holding the longitudinal strip 48 in contact with the casing. Such apparatus might include one or more magnetic positioning devices or magnets 62.

The use of magnetic positioning devices to hold a sonde against the wall of a cased borehole is known, (see, for example, U.S. Pat. Nos. 3,191,144, to Pardue, issued June 22, 1965 and 2,530,308 to Martin, issued Nov. 14, 1950) and, referring to FIG. 3, such devices generally include a magnet 64 within a sonde housing 66. Between the magnet and the housing is a filler 68, which may consist of a mixture of aluminum oxide and epoxy or any other material suitable for maintaining the pressure integrity of the sonde. If required, the magnetic position device 62 may also include a central passageway 70, through which are run the control and power cables necessary to operate and obtain information from the sonde.

With the dual-spacing neutron sonde referred to above, two magnetic positioning devices 62 are employed. As shown in FIG. 1, one device is located in the upper head section 28 and the second is located in the lower nose section 32. Thereby, the sonde detector count rates will be the highest rates possible.

When a magnetic positioning device 62 is used to hold the sonde against the borehole casing 12, abrasion of the longitudinal strip of the sonde housing 34 may result, and it will be desirable to provide an abrasion resistant coating 72 on the strip to minimize the wearing down of the housing 34. Suitable protection is provided by a 10 to 15 mil coating of tungsten carbide applied to the sonde 26 in a conventional manner.

In operation, the sleeve 42 is attached to the sonde 26 at the earth's surface and the log is run in the conventional manner, with no other modification to the sonde required to correct for the nonfluid-environment in the borehole even though the sonde is designed and intended for use in a fluid-filled borehole environment.

Although the invention has been described with reference to specific embodiments thereof, many other variations and modifications of the invention will be apparent to those skilled in the art without departing from the spirit and scope of the invention. For example, the enlarged zone or sleeve 40 may be used on a sonde designed and intended for use in a fluid-filled uncased borehole environment. The above described embodiments are, therefore, intended to be merely exemplary, and all such variations and modifications are intended to be included within the scope of the invention as defined in the appended claims.

I claim:

1. An elongated sleeve for use with a sonde in logging a subsurface earth formation transversed by nonfluid-filled borehole to determine a selected formation parameter, which sonde has a portion adapted to house a source for emitting radiation into the earth formation and a portion adapted to house at least one radiation detector spaced from the source for use in determining a selected formation parameter comprising a covering member formed to cover a detector portion of a sonde and fabricated of a material selected to provide a particular borehole environment, the member being adapted for attachment to the sonde to prevent substantial longitudinal and rotational movement therebetween and having, in transverse cross-section, (1) an outer surface that conforms generally to a portion of a borehole and (2) an inner surface that conforms generally to the portion of a sonde.

2. An elongated sleeve according to claim 1, wherein the outer and inner surfaces are, in transverse cross-section, generally eccentric with respect to one another whereby the sonde is eccentered within a borehole.

3. An elongated sleeve according to claim 2, wherein the outer and inner surfaces intersect and form a sleeve that, in transverse cross-section, is crescent shaped to partially cover the sonde whereby a longitudinal strip of the sonde is uncovered for the extent of the sleeve.

4. An elongated sleeve according to claim 1, wherein the covering member is fabricated of a high density polyethylene material.

5. In an apparatus for logging in a nonfluid-filled borehole traversing a subsurface earth formation that includes an exploring device having (1) a diameter smaller than the inner diameter of the cased borehole (2) a portion adapted to house a source for emitting radiation into the earth formation and (3) a portion adapted to house at least one radiation detector spaced from the source for use in determining a selected formation parameter, the improvement comprising the provision of a zone of the device that is enlarged with respect to the device diameter and is fabricated of a material selected to provide a particular borehole environment, the enlarged zone encompassing a portion of the device that includes the detector portion and having an outer surface that, in transverse cross-section, conforms generally to a portion of a borehole.

6. Apparatus according to claim 5, wherein there are two radiation detectors at different spacings from the source and the outer surface of the enlarged zone is, in transverse cross-section, eccentric with respect to the diameter of the device.

7. Apparatus according to claim 6, wherein the eccentricity of the enlarged zone with respect to the device is such that a longitudinal strip of the zone coincides, in transverse cross-section, with the diameter of the device.

8. Apparatus according to claim 6, wherein the radiation emitting source is a neutron source and the enlarged zone is fabricated of a hydrogenous material.

9. In apparatus for logging in a nonfluid-filled borehole traversing a subsurface earth formation that includes a sonde having a portion adapted to house a source for emitting radiation into the earth formation and a portion adapted to house at least one radiation detector spaced from the source for use in determining a selected formation parameter, the improvement comprising an elongated covering member fabricated of a material selected to provide a particular borehole environment and covering a selected portion of the sonde that includes the detector portion, the member having, in transverse cross-section, (1) an outer surface that conforms generally to a portion of a borehole and (2) an inner surface that conforms generally to a portion of the sonde, the member adapted to be secured to the sonde to prevent longitudinal and rotational movement therebetween.

10. Apparatus according to claim 9, wherein there are two radiation detectors at different spacings from the source and the outer and inner surfaces are, in transverse cross-section, generally eccentric with respect to one another.

11. Apparatus according to claim 10, wherein the radiation emitting source in a neutron source and the covering member is fabricated of a hydrogenous material.

12. Apparatus according to claim 10, wherein the outer and inner surfaces intersect and form a covering member that, in transverse cross-section, is crescent shaped and partially covers the sonde whereby a longitudinal strip of the sonde is uncovered for the extent of the member.

13. Apparatus according to claim 12, for use in a non-fluid-filled cased borehole wherein the apparatus further includes means for holding the longitudinal strip in contact with a borehole casing.

14. Apparatus according to claim 13, wherein the longitudinal strip is provided with an abrasion resistant coating and the holding means includes at least one magnetic positioning device.

15. Apparatus according to claim 9, further including means for securing the covering member to the sonde.

16. Apparatus according to claim 15, wherein:
 the covering member is formed to receive at least one transversely oriented pin that intersects the outer and inner surfaces, and
 the securing means includes at least one slot at a transverse orientation in said selected sonde portion and at least one pin, each pin extending transversely through the covering member to engage one slot.

17. In apparatus for logging in a nonfluid-filled borehole traversing a subsurface earth formation that includes a sonde having a portion adapted to house a neutron emitting source for irradiating the earth formation and a portion adapted to house at least one radiation detector spaced from the source for use in determining a selected formation parameter, the improvement comprising:
 a covering member fabricated of a hydrogenous material and covering a selected portion of the sonde that includes the detector portion, the member having, in transverse cross-section, (1) an outer surface that conforms generally to a portion of a borehole and (2) an eccentric inner surface that conforms generally to a portion of the sonde, a longitudinal strip of the sonde being uncovered by the member along the length thereof, and
 means for securing the covering member to the sonde to prevent longitudinal and rotational movement therebetween.

18. Apparatus according to claim 17, wherein the member is crescent shaped in transverse cross-section and partially covers the sonde to leave the longitudinal strip of the sonde uncovered.

19. Apparatus according to claim 17, wherein the securing means includes at least one slot in the sonde at a transverse orientation in the selected sonde portion and at least one pin, each pin extending transversely through the member to engage one slot.

20. Apparatus according to claim 17, wherein the sonde includes two detectors at different spacings from the source and the member covers only the detector portion of the sonde.

21. Apparatus according to claim 20, wherein the member is fabricated of a high density polyethylene material.

22. Apparatus according to claim 17 for use in a non-fluid-filled cased borehole and further including means for holding the longitudinal strip in contact with a borehole casing.

23. Apparatus according to claim 22, wherein the longitudinal strip is provided with an abrasion resistant coating and the holding means includes at least one magnetic positioning device.

24. In apparatus for logging in a nonfluid, cased borehold traversing a subsurface earth formation that includes a sonde having a portion adapted to house a neutron emitting source for irradiating the earth formation and a portion adapted to house at least one radiation detector spaced from the source for use in determining a selected formation parameter, the improvement comprising:
 a covering member fabricated of a hydrogenous material and covering a selected portion of the sonde that includes the detector portion, the member being crescent shaped in transverse cross-section and having (1) an outer surface that conforms generally to a portion of a borehole and (2) an eccentric inner surface that conforms generally to a portion of the sonde, a longitudinal strip of the sonde being uncovered by the crescent shaped member along the length thereof;
 means for securing the covering member to the sonde to prevent longitudinal and rotational movement therebetween including (1) two slots in the sonde in said selected sonde portion, each slot being at a transverse orientation to the sonde and (2) two pins that extend transversely through the member each pin engaging one of the slots, and
 means for holding the longitudinal strip in contact with the borehole casing including one magnetic positioning device at each end of the sonde.

* * * * *